US009237540B2

(12) United States Patent
Chang et al.

(10) Patent No.: US 9,237,540 B2
(45) Date of Patent: *Jan. 12, 2016

(54) STATION FOR DATA TRANSMISSION/RECEPTION SYNCHRONIZATION

(71) Applicant: Electronics and Telecommunications Research Institute, Daejeon (KR)

(72) Inventors: Kap Seok Chang, Daejeon (KR); Sung Geun Jin, Daejeon (KR); Hyun Kyu Chung, Daejeon (KR); Woo Yong Lee, Daejeon (KR); Hyoung Jin Kwon, Cheongju-Si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,901

(22) Filed: Dec. 30, 2014

(65) Prior Publication Data
US 2015/0139069 A1 May 21, 2015

Related U.S. Application Data

(63) Continuation of application No. 13/392,709, filed as application No. PCT/KR2010/005677 on Aug. 25, 2010, now Pat. No. 8,929,355.

(30) Foreign Application Priority Data

| Aug. 25, 2009 | (KR) | ......................... 10-2009-0078934 |
| Feb. 16, 2010 | (KR) | ......................... 10-2010-0013944 |
| Feb. 22, 2010 | (KR) | ......................... 10-2010-0015531 |
| Mar. 4, 2010 | (KR) | ......................... 10-2010-0019433 |
| Aug. 24, 2010 | (KR) | ......................... 10-2010-0082027 |

(51) Int. Cl.
*H04J 1/10* (2006.01)
*H04W 56/00* (2009.01)
*H04B 7/155* (2006.01)

(52) U.S. Cl.
CPC ......... *H04W 56/005* (2013.01); *H04B 7/15592* (2013.01); *H04W 56/001* (2013.01); *H04W 56/002* (2013.01); *H04W 56/0045* (2013.01)

(58) Field of Classification Search
None
See application file for complete search history.

(56) References Cited

U.S. PATENT DOCUMENTS

| 8,228,955 B2 | 7/2012 | Tamaki |
| 8,929,355 B2 * | 1/2015 | Chang et al. .................. 370/350 |

(Continued)

FOREIGN PATENT DOCUMENTS

| CN | 101395824 A | 3/2009 |
| KR | 2001-0007391 A | 1/2001 |

(Continued)

OTHER PUBLICATIONS

Saurabh Ganeriwal et.al. Time Sync Protocol for Sensor Networks.

(Continued)

*Primary Examiner* — Minh-Trang Nguyen
(74) *Attorney, Agent, or Firm* — Rabin & Berdo, P.C.

(57) ABSTRACT

A source station for synchronization of transmission and reception of data in a cooperative communication system includes a first receiver to receive, from a destination station, a first request frame including information regarding a first point in time when a first response frame is to be transmitted; a first transmitter to transmit the first response frame to the destination station, at the first point in time; a second transmitter to transmit, to a relay station, a second request frame including information regarding a second point in time when a second response frame is to be transmitted; a second receiver to receive the second response frame transmitted by the relay station at the second point in time; and a time estimator to estimate a first propagation delay time between the source station and the relay station, based on a time in which the second response frame is received.

6 Claims, 20 Drawing Sheets

(56) References Cited

U.S. PATENT DOCUMENTS

| | | |
|---|---|---|
| 2005/0169232 A1* | 8/2005 | Sakoda et al. ............... 370/347 |
| 2007/0171853 A1* | 7/2007 | Jones et al. ................. 370/328 |
| 2009/0109938 A1* | 4/2009 | Singh et al. ................. 370/337 |
| 2009/0232113 A1* | 9/2009 | Tamaki ........................ 370/337 |

FOREIGN PATENT DOCUMENTS

| | | |
|---|---|---|
| KR | 2007-0086976 A | 8/2007 |
| KR | 2008-0029421 A | 4/2008 |
| KR | 2008-0042421 A | 5/2008 |
| KR | 2009-0055338 A | 6/2009 |
| WO | WO-2005/091573 A1 | 9/2005 |
| WO | WO-2007-082953 A1 | 7/2007 |

OTHER PUBLICATIONS

Time Synchronisatzion Requirements.
Kapseok Chang (Jul. 2009) Service Coverage Extension.

* cited by examiner

STATION FOR DATA TRANSMISSION/RECEPTION SYNCHRONIZATION

CROSS-REFERENCE TO THE RELATED APPLICATIONS

This is a continuation of U.S. application Ser. No. 13/392,709, filed on Feb. 27, 2012, which is, in turn, a national stage of PCT application number PCT/KR2010/005677, filed Aug. 25, 2010. Furthermore, this application claims the foreign priority benefit of Korean applications number 10-2009-0078934, filed Aug. 25, 2009, Korean application number 10-2010-0013944, filed Feb. 16, 2010, Korean application 10-2010-0015531, filed Feb. 22, 2010, Korean application 10-2010-0019433, filed Mar. 4, 2010, and Korean application 10-2010-0082027, filed Aug. 24, 2010. The disclosures of these prior applications are incorporated herein by reference.

TECHNICAL FIELD

The present invention relates to a synchronization control method for transmission and reception of data and a station for transmission and reception of data, and more particularly, to a method and station for controlling synchronization by correcting a frequency offset, or a point in time when data is transmitted.

BACKGROUND ART

In a general wireless communication system, for example a Wireless Local Area Network (WLAN) or Wireless Personal Area Network (WPAN) environment, such as an Institute of Electrical and Electronics Engineers (IEEE) 802.11, terminals may be operated independently. Accordingly, it is difficult to control a signal transmitted from a transmission terminal to be received to a reception terminal at the same time after a frequency offset is corrected.

Additionally, in the above-described wireless communication environment, a common preamble structure is employed. When at least two transmission terminals simultaneously transmit data, a point in time when a signal is received to a reception terminal is difficult to be included within a predetermined margin of error. Since it is impossible to correct a frequency offset between different available frequencies for each terminal, even when the point in time is included within the predetermined margin of error, the received signal may be distorted due to multiple frequency offsets.

DISCLOSURE OF INVENTION

Technical Goals

An aspect of the present invention provides a synchronization control method for transmission and reception of data, and a station for transmission and reception of data that may enable a reception terminal to receive data without distortion.

Another aspect of the present invention provides a mechanism that may apply a preamble structure to an easily extensible transmission terminal, may estimate a frequency offset and a reception point in time when data arrives at a reception terminal, and may adjust a point in time when the transmission terminal transmits a signal with the corrected frequency offset.

Other features and advantages of the invention may be understood from the following description and be more apparent from embodiments of the invention. Also, features and advantages of the invention may be easily performed by means disclosed in the claims and combinations thereof.

Technical Solutions

According to an aspect of the present invention, there is provided a synchronization control method of a first terminal for transmission and reception of data in a cooperative communication system, the synchronization control method including: transmitting, to a second terminal and a third terminal, a first request frame and a second request frame that include information on points in time when a first response frame and a second response frame are transmitted, respectively; receiving the first response frame and the second response frame from the second terminal and the third terminal; estimating a first propagation delay time between the first terminal and the second terminal, and a second propagation delay time between the first terminal and the third terminal, based on times in which the first response frame and the second response frame are received; and transmitting, to the second terminal, a third request frame including information on a delay time difference between the first propagation delay time and the second propagation delay time.

According to another aspect of the present invention, there is provided a synchronization control method of a first terminal for transmission and reception of data in a cooperative communication system, the synchronization control method including: receiving, from a second terminal, a first request frame including information on a first point in time when a first response frame is transmitted; transmitting the first response frame to the second terminal at the first point in time; and receiving a second request frame from the second terminal, wherein the second request frame includes information on a delay time difference between a first propagation delay time between the first terminal and the second terminal and a second propagation delay time between a third terminal and the second terminal.

According to still another aspect of the present invention, there is provided a synchronization control method of a first terminal for transmission and reception of data in a cooperative communication system, the synchronization control method including: receiving, from a third terminal, a first request frame including information on a first point in time when a first response frame is transmitted; transmitting the first response frame to the third terminal, at the first point in time; transmitting, to a second terminal, a second request frame including information on a second point in time when a second response frame is transmitted; receiving the second response frame from the second terminal; and estimating a first propagation delay time between the first terminal and the second terminal, based on a time in which the second response frame is received, wherein the third terminal estimates a second propagation delay time between the first terminal and the third terminal, using a time in which the first response frame is received, and estimates a third propagation delay time between the second terminal and the third terminal, using a third response frame received from the second terminal.

According to yet another aspect of the present invention, there is provided a destination station for synchronization of transmission and reception of data in a cooperative communication system, the destination station including: a first transmitter to transmit, to a relay station and a source station, a first request frame and a second request frame that include information on points in time when a first response frame and a second response frame are transmitted, respectively; a first receiver to receive the first response frame and the second response frame from the relay station and the source station; a time estimator to estimate a first propagation delay time between the destination station and the relay station, and a second propagation delay time between the destination station and the source station, based on times in which the first response frame and the second response frame are received; and a second transmitter to transmit, to the relay station or the source station, a third request frame including information on a delay time difference between the first propagation delay time and the second propagation delay time.

According to a further another aspect of the present invention, there is provided a relay station for synchronization of transmission and reception of data in a cooperative communication system, the relay station including: a first receiver to receive, from a destination station, a first request frame including information on a first point in time when a first response frame is transmitted; a first transmitter to transmit the first response frame to the destination station, at the first point in time; and a second transmitter to receive a second request frame from the destination station, wherein the second request frame includes information on a delay time difference between a first propagation delay time between the relay station and the destination station and a second propagation delay time between a source station and the destination station.

According to a further another aspect of the present invention, there is provided a source station for synchronization of transmission and reception of data in a cooperative communication system, the source station including: a first receiver to receive, from a destination station, a first request frame including information on a first point in time when a first response frame is transmitted; a first transmitter to transmit the first response frame to the destination station, at the first point in time; a second transmitter to transmit, to a relay station, a second request frame including information on a second point in time when a second response frame is transmitted; a second receiver to receive the second response frame from the relay station; and a time estimator to estimate a first propagation delay time between the source station and the relay station, based on a time in which the second response frame is received, wherein the destination station estimates a second propagation delay time between the destination station and the source station, based on a time in which the first response frame is received, and estimates a third propagation delay time between the relay station and the destination station, based on a third response frame received from the relay station.

Effect of the Invention

According to embodiments of the present invention, information on a frequency offset and a transmission point in time with respect to a terminal included in a wireless communication system may be estimated, and the terminal may be provided with the estimated information, and thus it is possible to control synchronization for transmission and reception of data.

Additionally, according to embodiments of the present invention, a point in time when a signal is transmitted may be adjusted for synchronization between terminals included in a cooperative communication system and thus, it is possible for a terminal to receive data without distortion.

BEST MODE FOR CARRYING OUT THE INVENTION

For detailed description so that those skilled in the art may easily implement the technical spirit of the invention, exemplary embodiments of the invention will be described with reference to the accompanying drawings. The above objectives, features, and advantages will be more apparent from the following description associated with the accompanying drawings. When it is determined that detailed description related to the known art may make the purpose of the invention unnecessarily ambiguous in describing the invention, the detailed description will be omitted here.

Figure 1:
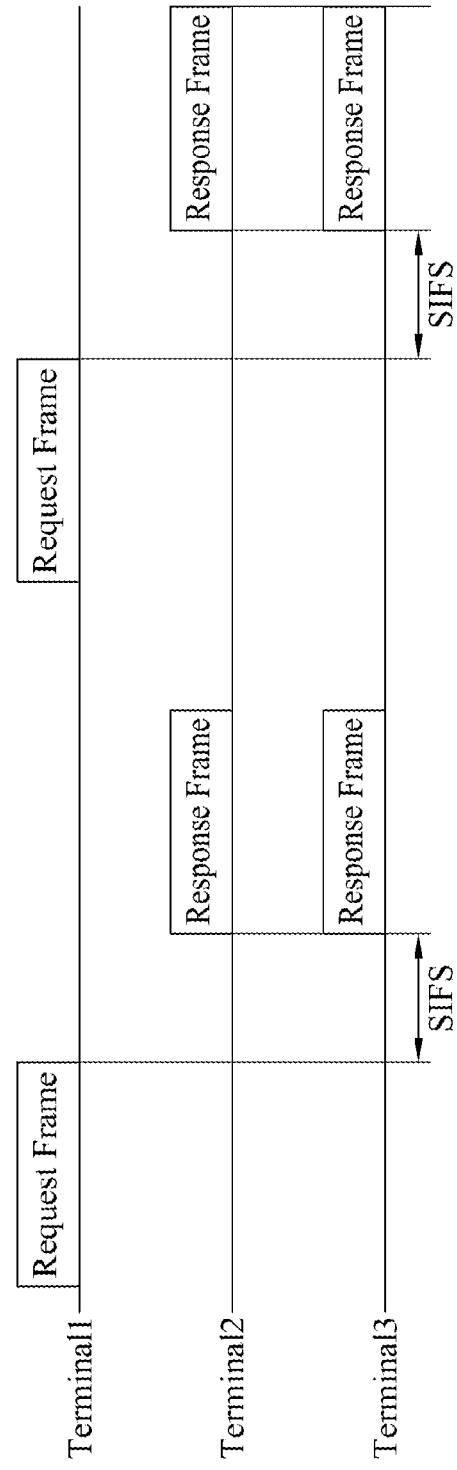
FIGS. 1 through 3 illustrate diagrams to describe transmission and reception of frames between terminals in a general wireless communication system.
Figure 2:
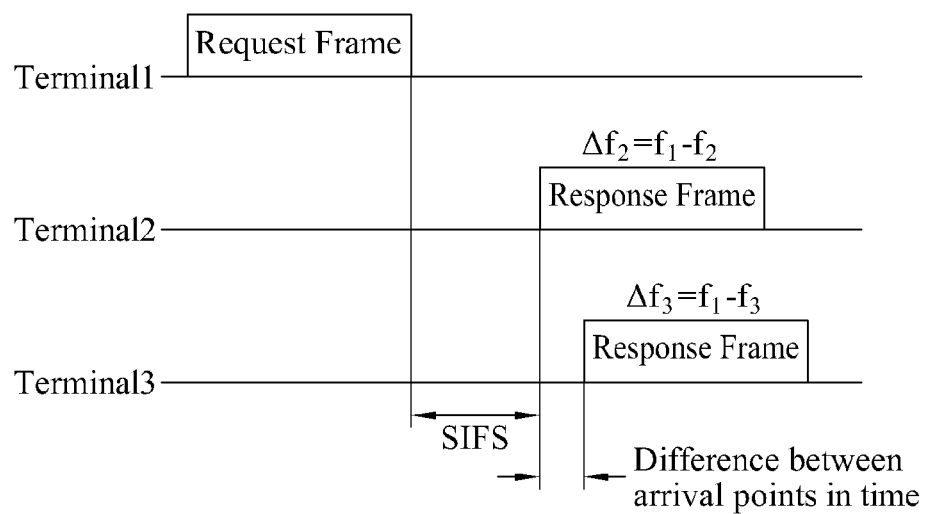
Figure 3:
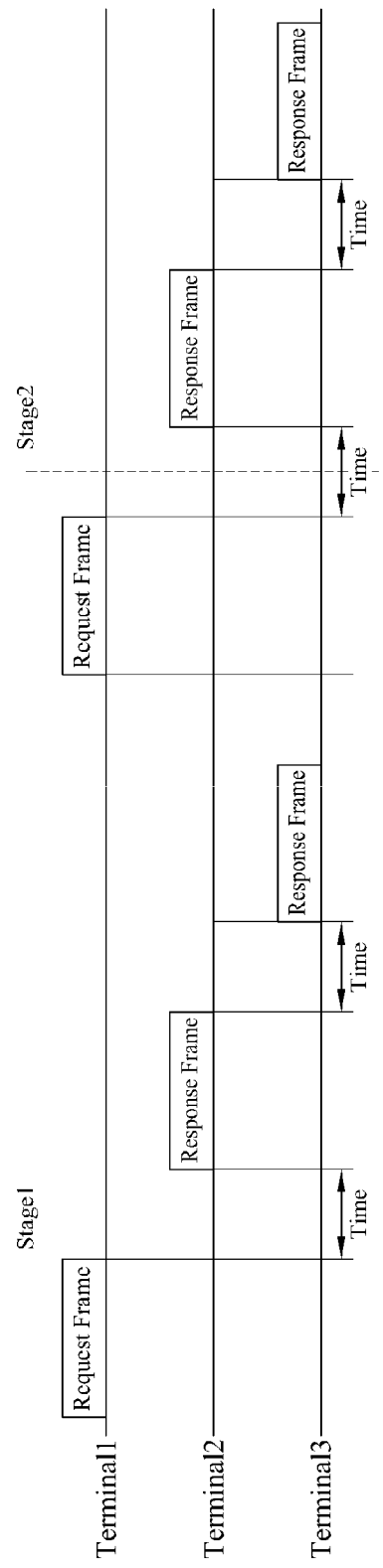

FIGS. 1 through 3 illustrate diagrams to describe transmission and reception of frames between terminals in a general wireless communication system. In FIGS. 1 through 3, frames may be transmitted and received between terminals in an Institute of Electrical and Electronics Engineers (IEEE) 802.11 Wireless Local Area Network (WLAN) environment, namely, a wireless communication system that is representative of a short-range wireless communication system.

In the IEEE 802.11 WLAN environment, when a transmission terminal multicasts or broadcasts a request frame to at least two reception terminals, the reception terminals may transmit response frames to the transmission terminal after a Short Inter-Frame Space (SIFS). For example, as shown in FIG. 1, when a first terminal transmits a request frame to a second terminal and a third terminal, the second terminal and the third terminal may simultaneously transmit response frames to the first terminal after a SIFS. The above operation may be repeatedly performed for transmission and reception of data. Additionally, when the first terminal communicates with the second terminal and the third terminal, another terminal may not intervene in communication.

As shown in FIG. 2, an arrival point in time when a response frame transmitted by a second terminal arrives at a first terminal may be different from an arrival point in time when a response frame transmitted by a third terminal arrives at the first terminal, and a frequency offset may exist. In FIG. 2, a horizontal axis indicates a time in which a frame is transmitted by each terminal, and as a result a difference between points in time when the second terminal and the third terminal transmit response frames may be represented as a difference between the arrival points in time when the response frames arrives.

Since a distance from the first terminal to the second terminal differs from a distance from the first terminal to the third terminal, the arrival points in time may be different from each other. In other words, even when the first terminal transmits a request frame to the second terminal and the third terminal at the same time, the request frame may arrive at the second terminal and the third terminal at different points in time, and accordingly points in time when the response frames are transmitted may be different from each other. Alternatively, even when the second terminal and the third terminal simultaneously transmit response frames to the first terminal, the response frames may arrive at the first terminal at different points in time, due to a difference between the distance from the first terminal to the second terminal and the distance from the first terminal to the third terminal The frequency offset may be caused by a difference between an operating frequency of a local oscillator of the first terminal and an operating frequency of a local oscillator of the second terminal, and a difference between the operating frequency of the local oscillator of the first terminal and an operating frequency of a local oscillator of the third terminal. Alternatively, the frequency offset may occur based on a wireless channel state between the first terminal and the second terminal, and a wireless channel state between the first terminal and the third terminal.

More specifically, in FIG. 2, a frequency offset $\Delta f_2$ between the first terminal and the second terminal may indicate a difference between an operating frequency $f_1$ of a local oscillator of the first terminal and an operating frequency $f_2$ of a local oscillator of the second terminal Additionally, a frequency offset $\Delta f_3$ between the first terminal and the third terminal may indicate a difference between the operating frequency $f_1$ of the local oscillator of the first terminal and an operating frequency $f_3$ of a local oscillator of the third terminal. Since the two values $\Delta f_2$ and $\Delta f_3$ are typically different from each other, multiple frequency offsets may occur in the first terminal In particular, based on the IEEE 802.11 standard, a SIFS time may allow an error between +10% and −10% during a single time slot. Since in the IEEE 802.11b and g, a SIFS time is defined to be 10 us and a single slot time is defined to be 20 us, the SIFS time may be changed from 8 us to 12 us. For example, assuming that two terminals transmit the same signals using an Orthogonal Frequency Division Multiplexing (OFDM) scheme of 802.11g, a maximum difference between arrival points in time when signals transmitted by two terminals arrive may be 4 us, since a length of a Cyclic Prefix (CP) is defined to be 800 ns. In other words, a difference between times in which the signals are received from the two terminals may be greater than the length of the CP, and there is no separate control procedure for synchronization of the transmitted signals and accordingly, it is difficult for a reception terminal to properly restore the received signals.

As shown in FIG. 3, a second terminal and a third terminal may transmit response frames to a first terminal in response intervals that do not overlap with each other. After a pre-defined time, the second terminal and the third terminal may transmit the response frames to the first terminal. In a cooperative communication system being discussed in IEEE 802.11 ad, a relay station (the second terminal) and a source station (the third terminal) need to transmit data, so that a destination station (the first terminal) may receive the data at the same time or within a predetermined margin of error in a reception time. In other words, all data transmitted by the relay station (the second terminal) and the source station (the third terminal) may need to be received to the destination station (the first terminal), at the same time or within the predetermined margin of error in the reception time.

However, in this instance, a frequency offset may occur, and there may be a difference between points in time when the data transmitted by the relay station (the second terminal) and the source station (the third terminal) is received to the destination station (the first terminal).

Hereinafter, in the present invention, a synchronization control method for adjusting a frequency offset and points in time when data is transmitted and received will be described. According to the present invention, synchronization for transmission and reception of data may be controlled so that a reception terminal may properly restore a received signal, that is, so that the reception terminal may receive a signal without distortion. Here, the controlling of the synchronization may refer to adjusting points in time when data is transmitted and received so that the reception terminal receives data within a predetermined margin of error in a reception time, or adjusting a frequency so that a frequency offset occurs within a predetermined margin of error.

Additionally, hereinafter, a synchronization control method performed between three terminals in an OFDM-based wireless communication system will be described as an embodiment, but there is no limitation thereto. Additionally, the term 'terminal' used herein may be a concept that includes all of an Access Point (AP), a station, and the like.

Figure 4:
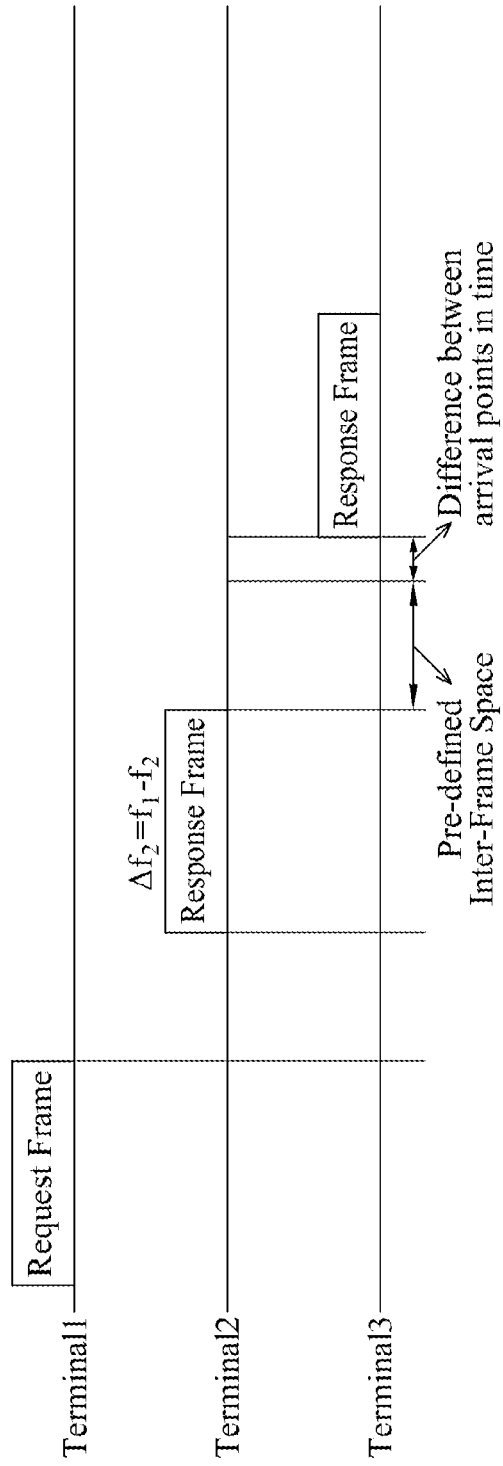
FIGS. 4 and 5 illustrate diagrams to describe a concept of a synchronization control method according to an embodiment of the present invention.
Figure 5:
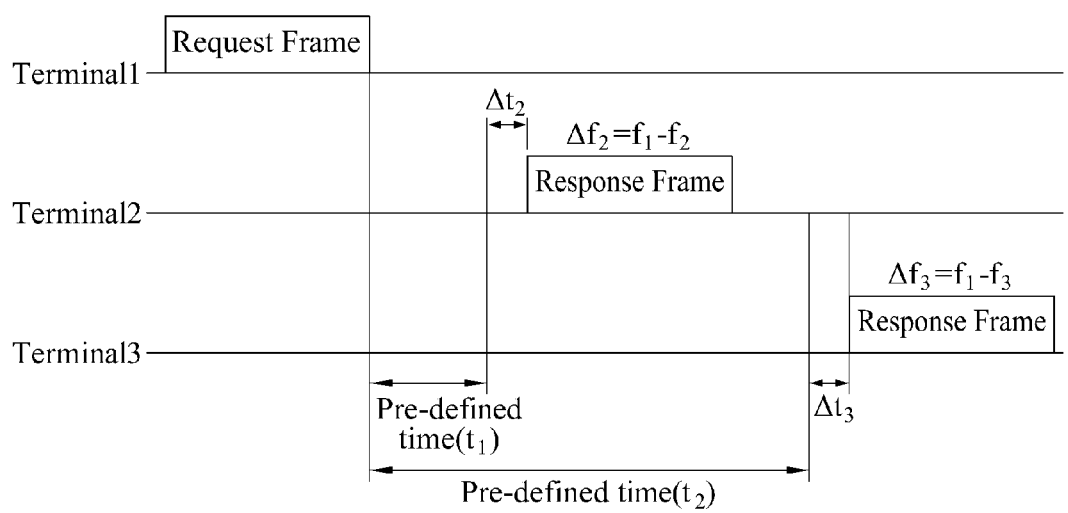

FIGS. 4 and 5 illustrate diagrams to describe a concept of a synchronization control method according to an embodiment of the present invention.

As shown in FIG. 4, a first terminal may transmit request frames to a second terminal and a third terminal Here, the first terminal may transmit a single request frame to the second terminal and the third terminal, or may respectively transmit request frames to the second terminal and the third terminal. Additionally, the request frame may be used to adjust a frequency offset or a point in time when data is transmitted, and may include information on a point in time when response frames are to be transmitted by the second terminal and the third terminal in response to the request frame.

In response to the request frame, the second terminal and the third terminal may transmit response frames to the first terminal. The second terminal and the third terminal may transmit response frames in response intervals that do not overlap with each other. Information on the response intervals may be provided by an AP, or a Personal Basic Service Set Central Point (PCP).

The first terminal may estimate a frequency offset, and a difference between arrival points in time when the response frames transmitted by the second terminal and the third terminal arrive, using the response frames. In this instance, the first terminal may estimate the difference between the arrival points in time when the response frames transmitted by the second terminal and the third terminal arrive, based on a length of the response frame received from the second terminal, and a pre-defined inter-frame space. In other words, since the response frame transmitted by the third terminal needs to arrive at the first terminal, immediately after the pre-defined inter-frame space when the response frame is transmitted by the second terminal, the first terminal may estimate the difference between the arrival points in time when the response frames transmitted by the second terminal and the third terminal arrive, based on the arrival point in time when the response frame transmitted by the third terminal arrives.

As shown in FIG. 4, the arrival point in time when the response frame transmitted by the third terminal arrives may differ from the arrival point in time when the response frame transmitted by the second terminal arrives. The above difference between the arrival points in time may be caused by a difference in propagation delay time between terminals that transmit and receive a signal. In this instance, the difference between the arrival points in time may be considered to be a difference between propagation delay times.

The first terminal may transmit, to the second terminal and the third terminal, estimated information, namely, information on frequency offsets $\Delta f_2$ and $\Delta f_3$, and the difference between the arrival points in time when the response frames transmitted by the second terminal and the third terminal arrive. The first terminal may estimate the frequency offsets $\Delta f_2$ and $\Delta f_3$, using a frequency $f_1$ of the first terminal and frequencies $f_2$ and $f_3$ received from the second terminal and the third terminal. The second terminal and the third terminal may control synchronization using the information received from the first terminal. In this instance, the estimated information may be included in the request frame and may be transmitted, and the request frame may include the estimated information, together with information on indices indicating the second terminal and the third terminal.

As shown in FIG. 5, a first terminal may estimate a frequency offset, and a difference between arrival points in time when response frames transmitted by a second terminal and a third terminal arrive. The first terminal may estimate a difference $\Delta t_2$ between arrival points in time, using a pre-defined time $t_1$ that is set to adjust a transmission point in time, and an arrival point in time when a signal transmitted by the second terminal arrives. Additionally, the first terminal may also estimate a difference $\Delta t_3$ between arrival points in time, using a pre-defined time $t_2$ that is set to adjust a transmission point in time, and an arrival point in time when a signal transmitted by the third terminal arrives.

Here, the pre-defined time may refer to a point in time when the response frame of FIG. 4 is transmitted. Additionally, a difference between a pre-defined time and a point in time when a substantial frame arrives may be a propagation delay time. The first terminal may estimate the frequency offsets $\Delta f_2$ and $\Delta f_3$, using the frequency $f_1$ of the first terminal and the frequencies $f_2$ and $f_3$ received from the second terminal and the third terminal.

Figure 6:
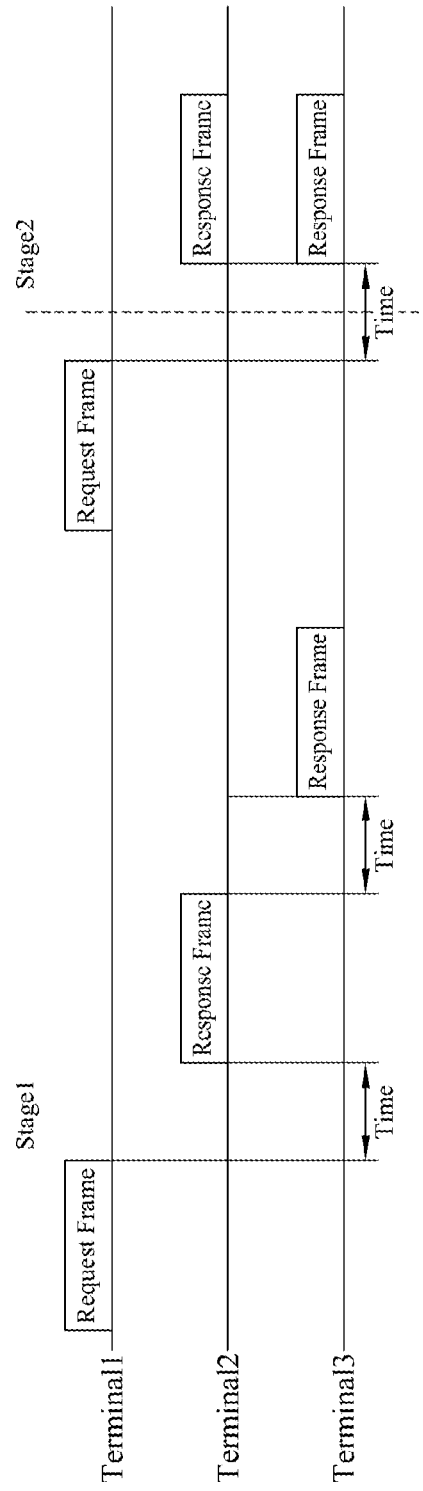
FIG. 6 illustrates a diagram to describe a concept of a synchronization control method according to another embodiment of the present invention.

FIG. 6 illustrates a diagram to describe a concept of a synchronization control method according to another embodiment of the present invention.

In a first stage of FIG. 6, information on a difference between arrival points in time, and information on a frequency offset may be estimated using a request frame and a response frame, as described above with reference to FIGS. 4 and 5. In a last phase of the first stage, a first terminal may transmit a request frame including the estimated information to a second terminal and a third terminal However, in the synchronization control method of FIG. 6, an operation based on a second stage may be further performed. The second terminal and the third terminal may transmit, to the first terminal, response frames in adjusted points in time, using the estimated information included in the request frame. In other words, the second terminal and the third terminal may transmit the response frames to the first terminal, so that the first terminal may receive the response frames at the same time or within a predetermined margin of error in a reception time. The first terminal may estimate times in which the response frames are received, and may determine whether synchronization control succeeds.

In this instance, the first terminal may transmit the request frame including the estimated information to either the second terminal or the third terminal. When the request frame is transmitted to the second terminal, the information on the difference between the arrival points in time may be included in the request frame. The information on the difference between the arrival points in time may enable the second terminal to adjust a transmission point in time based on the third terminal.

Figure 7:
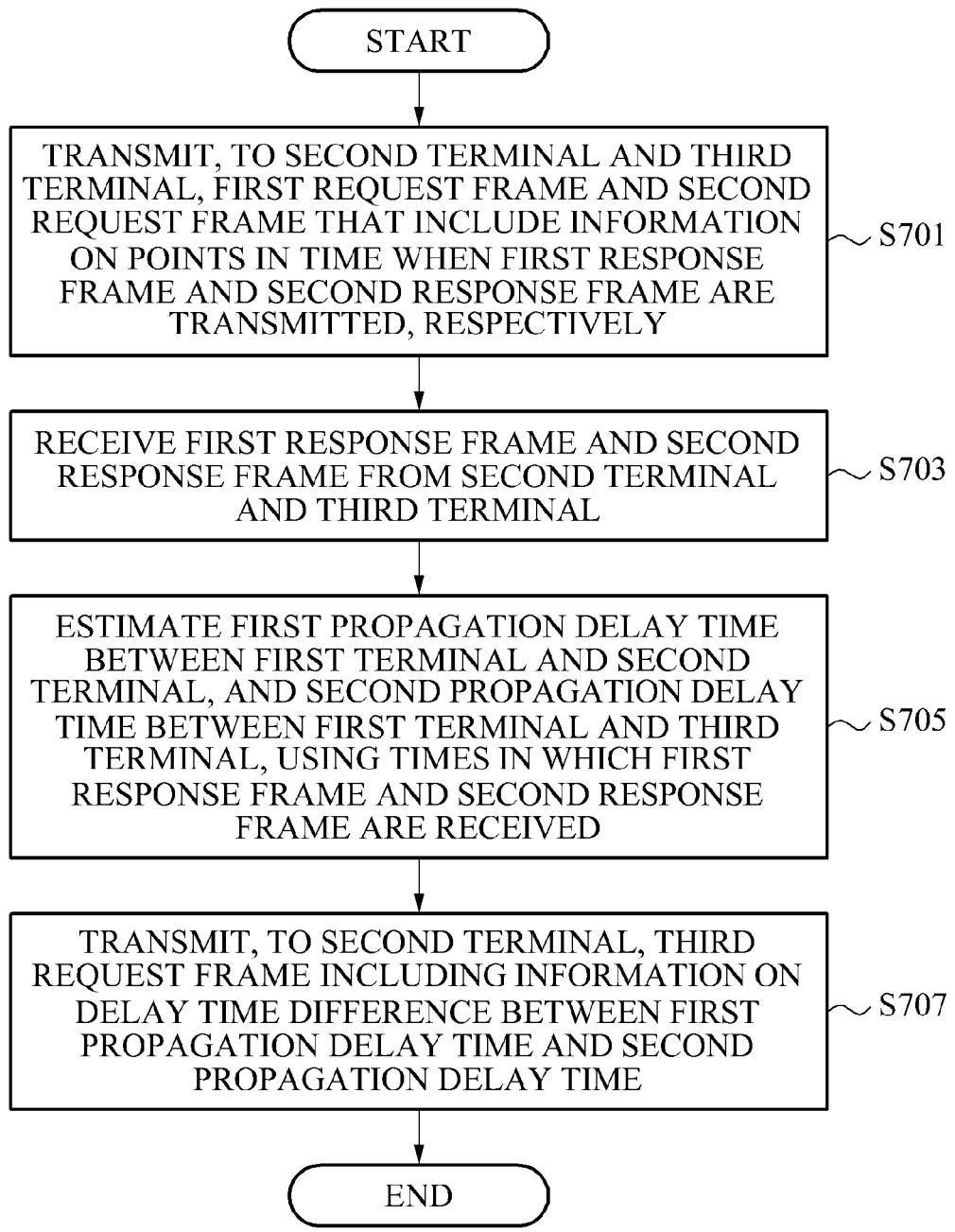
FIG. 7 illustrates a flowchart to describe a synchronization control method according to an embodiment of the present invention.

FIG. 7 illustrates a flowchart to describe a synchronization control method according to an embodiment of the present invention. In FIG. 7, a synchronization control method for transmission and reception of data in a cooperative communication system will be described as an embodiment, and a synchronization control method of the first terminal described with reference to FIGS. 4 through 6 will be described as an embodiment. In the cooperative communication system, the first terminal may be a destination station, and a second terminal or a third terminal may be a relay station or a source station.

In operation S701, the first terminal may transmit, to the second terminal and the third terminal, a first request frame and a second request frame that include information on points in time when a first response frame and a second response frame are transmitted, respectively. In this instance, the first terminal may transmit the first request frame to the second terminal, and after a SIFS, may transmit the second request frame to the third terminal.

In operation S703, the first terminal may receive the first response frame and the second response frame from the second terminal and the third terminal. The second terminal and the third terminal may transmit the first response frame and the second response frame to the first terminal, using the information on the points in time. When the second terminal receives a request frame earlier than the third terminal, the second terminal may transmit a response frame to the first terminal earlier than the third terminal, and response intervals of the second terminal and the third terminal may not overlap with each other.

In operation S705, the first terminal may estimate a first propagation delay time between the first terminal and the second terminal, and a second propagation delay time between the first terminal and the third terminal, using times in which the first response frame and the second response frame are received. During transmitting of a signal, a propagation delay time may exist, and the first terminal may estimate a propagation delay time using a response frame received after a transmission point in time included in the response frame. By estimating the propagation delay time, the first terminal may estimate a variance in time caused during transmitting and receiving of a signal with each of the second terminal and the third terminal. The first terminal may transmit, to the second terminal and the third terminal, a difference in the variation in time, namely, information on a delay time difference between the second terminal and the third terminal. The second terminal and the third terminal may adjust a transmission point in time, using the information on the delay time difference, and accordingly data transmitted from the second terminal and the third terminal may be synchronized and reach the first terminal.

In operation S707, the first terminal may transmit, to the second terminal, a third request frame including information on a delay time difference between the first propagation delay time and the second propagation delay time. As described above, the first terminal may also transmit the third request frame to the third terminal. The second terminal or the third terminal may adjust a transmission point in time, based on the information on the delay time difference, and may transmit data to the first terminal. Accordingly, a signal may be received to the first terminal from the second terminal and the third terminal within a predetermined margin of error in a reception point in time.

The synchronization control method according to the present invention may further include receiving a third response frame from the second terminal in response to the third request frame. The third request frame may further include information on a point in time at which the third response frame is transmitted. Accordingly, the second terminal or the third terminal may transmit the third response frame to the first terminal, after a time corresponding to the delay time difference between the first propagation delay time and the second propagation delay time elapses from the point in time when the third response frame is transmitted.

The request frame may further include information on a frequency offset.

Figure 8:
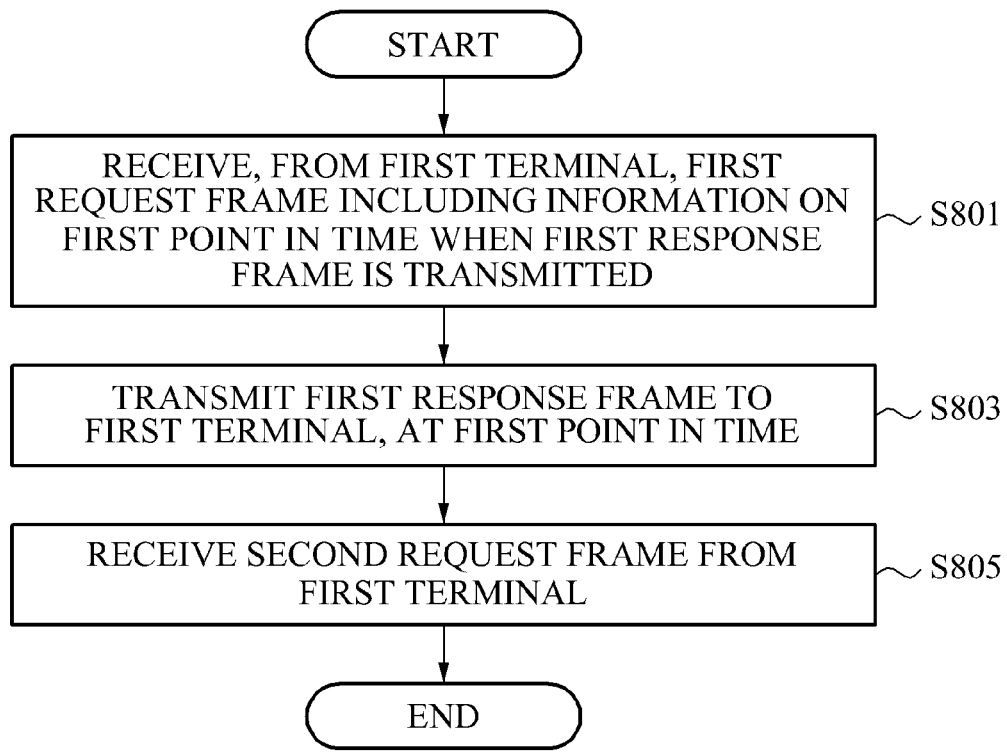
FIG. 8 illustrates a flowchart to describe a synchronization control method according to another embodiment of the present invention.

FIG. 8 illustrates a flowchart to describe a synchronization control method according to another embodiment of the present invention. In FIG. 8, a synchronization control method for transmission and reception of data in a cooperative communication system will be described as an embodiment, and a synchronization control method of the second terminal described with reference to FIGS. 4 through 6 will be described as an embodiment. In the cooperative communication system, a first terminal may be a destination station, and a second terminal or a third terminal may be a relay station or a source station.

In operation S801, the second terminal may receive, from the first terminal, a first request frame including information on a first point in time when a first response frame is transmitted. In operation S803, the second terminal may transmit the first response frame to the first terminal at the first point in time. In operation S805, the second terminal may receive a second request frame from the first terminal. The second request frame may include information on a delay time difference between a first propagation delay time between the second terminal and the first terminal and a second propagation delay time between the first terminal and a third terminal.

The synchronization control method according to the present invention may further include transmitting a second response frame to the first terminal, using the second request frame that further includes information on a second point in time when the second response frame is transmitted, after a pre-defined time elapses from the second point in time. In this instance, the pre-defined time may correspond to the delay time difference between the first propagation delay time and the second propagation delay time.

Additionally, the synchronization control method according to the present invention may further include receiving, from the third terminal, a third request frame including information on a third point in time when a third response frame is transmitted, and transmitting the third response frame to the third terminal in response to the third request frame. The above operations may be performed to adjust a transmission point in time between the second terminal and the third terminal in the cooperative communication system.

A frame may include information on a frequency offset.

Figure 9:
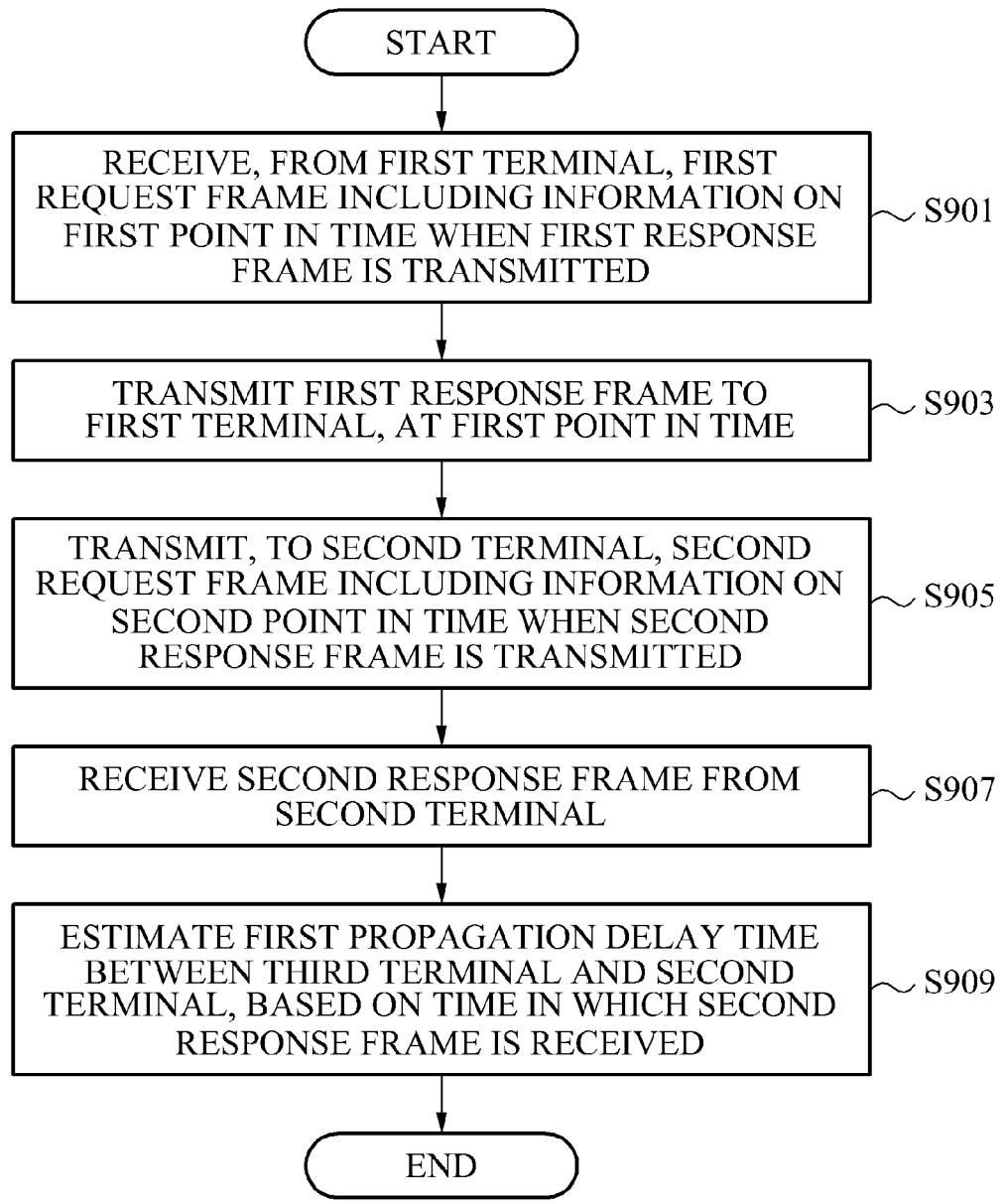
FIG. 9 illustrates a flowchart to describe a synchronization control method according to still another embodiment of the present invention.

FIG. 9 illustrates a flowchart to describe a synchronization control method according to still another embodiment of the present invention. In FIG. 9, a synchronization control method for transmission and reception of data in a cooperative communication system will be described as an embodiment, and a synchronization control method of the third terminal described with reference to FIGS. 4 through 6 will be described as an embodiment. In the cooperative communication system, a first terminal may be a destination station, and a second terminal or a third terminal may be a relay station or a source station.

In operation S901, the third terminal may receive, from the first terminal, a first request frame including information on a first point in time when a first response frame is transmitted. In operation S903, the third terminal may transmit the first response frame to the first terminal at the first point in time. In operation S905, the third terminal may transmit, to the second terminal, a second request frame including information on a second point in time when a second response frame is transmitted. In operation S907, the third terminal may receive the second response frame from the second terminal. In operation S909, the third terminal may estimate a first propagation delay time between the third terminal and the second terminal, based on a time in which the second response frame is received.

As described above, to adjust a transmission point in time between the second terminal and the third terminal in the cooperative communication system, the third terminal may transmit a request frame to the second terminal, and may estimate the first propagation delay time between the third terminal and the second terminal. The second terminal may transmit a request frame to the third terminal, and may estimate the first propagation delay time between the third terminal and the second terminal.

The first terminal may estimate a second propagation delay time between the first terminal and the third terminal, based on a time in which the first response frame is received, and may estimate a third propagation delay time between the first terminal and the second terminal, based on a third response frame received from the second terminal.

The present invention has been described above from view of a process, however, each operation constituting the synchronization control method for transmission and reception of data according to the present invention may be easily understood from view of an apparatus. Accordingly, each operation included in the synchronization control method for transmission and reception of data according to the present invention may be understood as a constituent element included in a station for transmission and reception of data, based on a principle of the present invention.

In the cooperative communication system according to the present invention, a destination station for synchronization of transmission and reception of data may include a first transmitter to transmit, to a relay station and a source station, a first request frame including information on a first point in time when a first response frame is transmitted; a first receiver to receive the first response frame from the relay station and the source station; a time estimator to estimate a first propagation delay time between the destination station and the relay station, and a second propagation delay time between the destination station and the source station, based on a time in which the first response frame is received; and a second transmitter to transmit, to the relay station or the source station, a second request frame including information on a delay time difference between the first propagation delay time and the second propagation delay time.

The destination station according to the present invention may further include a second receiver to receive a second response frame from the relay station. The second request frame that further includes information on a second point in time when the second response frame is transmitted may be transmitted to the destination station, after a time corresponding to the delay time difference between the first propagation delay time and the second propagation delay time elapses from the second point in time.

Additionally, in the cooperative communication system according to the present invention, a relay station for synchronization of transmission and reception of data may include a first receiver to receive, from a destination station, a first request frame including information on a first point in time when a first response frame is transmitted; a first transmitter to transmit the first response frame to the destination station at the first point in time; and a second transmitter to receive a second request frame from the destination station. The second request frame may include information on a delay time difference between a first propagation delay time between the relay station and the destination station and a second propagation delay time between a source station and the destination station.

The relay station according to the present invention may further include a third transmitter to transmit a second response frame to the destination station, using the second request frame that further includes information on a second point in time when the second response frame is transmitted, after a pre-defined time elapses from the second point in time. Here, the pre-defined time may correspond to the delay time difference between the first propagation delay time and the second propagation delay time.

Furthermore, in the cooperative communication system according to the present invention, a source station for synchronization of transmission and reception of data may include a first receiver to receive, from a destination station, a first request frame including information on a first point in time when a first response frame is transmitted; a first transmitter to transmit the first response frame to the destination station at the first point in time; a second transmitter to transmit, to a relay station, a second request frame including information on a second point in time when a second response frame is transmitted; a second receiver to receive the second response frame from the relay station; and a time estimator to estimate a first propagation delay time between the source station and the relay station, based on a time in which the second response frame is received. The destination station may estimate a second propagation delay time between the destination station and the source station, based on a time in which the first response frame is received, and may estimate a third propagation delay time between the relay station and the destination station, based on a third response frame received from the relay station.

FIGS. 10 through 13 illustrate diagrams to describe a synchronization control method according to embodiments of the present invention. A synchronization control method of a destination station (a first terminal), a relay station (a second terminal), and a source station (a third terminal) in a cooperative communication system will be described as an embodiment with reference to FIGS. 10 through 13. In FIGS. 10 through 13, $dT_{12}$ indicates a propagation delay time from the first terminal to the second terminal, $dT_{13}$ indicates a propagation delay time from the first terminal to the third terminal, and $dT_{32}$ indicates a propagation delay time from the third terminal to the second terminal.

Figure 10:
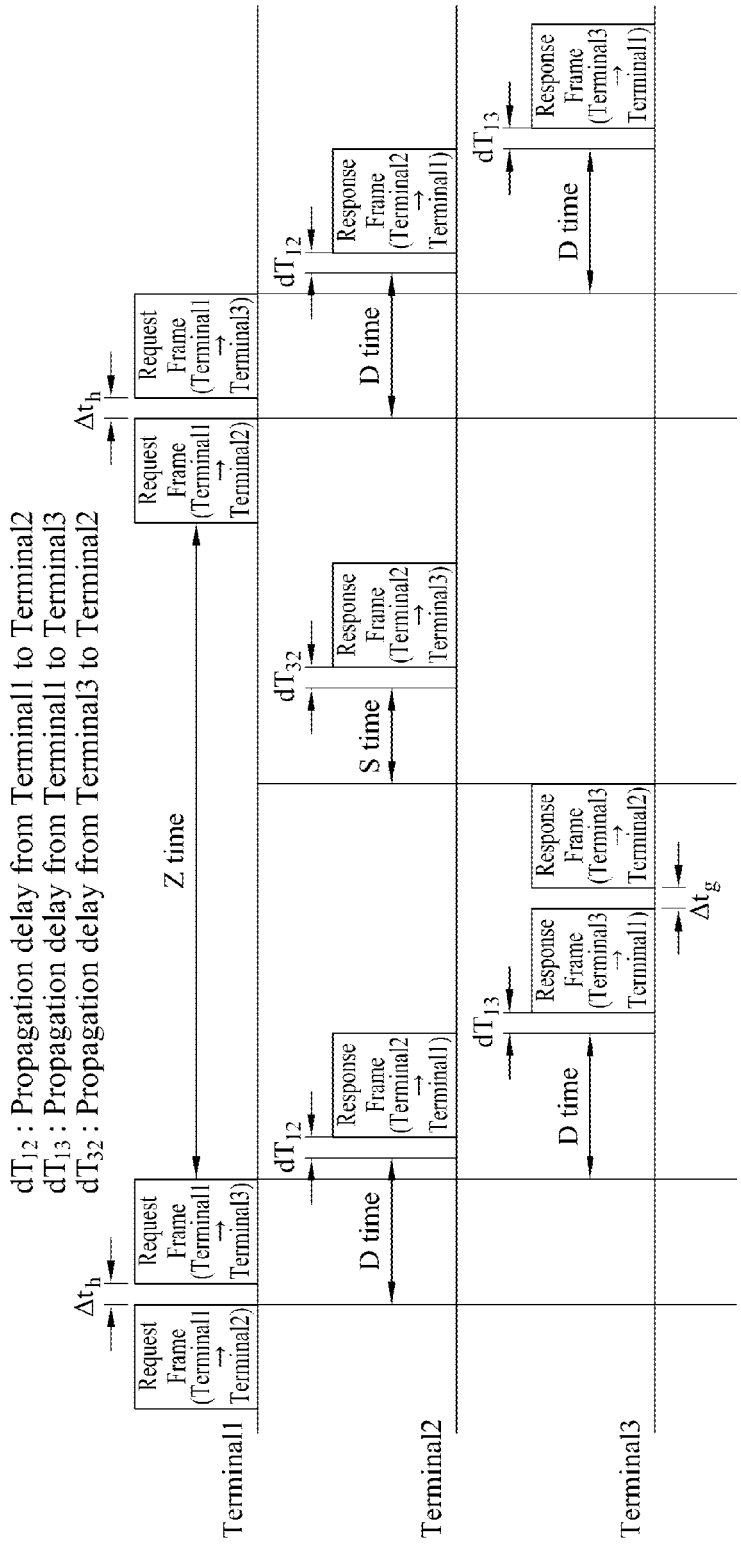
FIGS. 10 through 13 illustrate diagrams to describe a synchronization control method according to embodiments of the present invention.

First, in FIG. 10, the first terminal may transmit request frames to the second terminal and the third terminal. In this instance, the first terminal may transmit the request frames at a predetermined time interval $\Delta t_h$. The predetermined time interval $\Delta t_h$ may be a switching time for SIFS or beamforming. Additionally, the request frames may be used for at least one of adjustment of a transmission point in time and adjustment of a frequency offset, as described above. The request frames may include timing information 'D time' for response frames, namely, information on a transmission point in time, and the information on the transmission point in time may be determined based on a time in which a request frame is received.

The second terminal may transmit a response frame to the first terminal, using the information on the transmission point in time that is included in the request frame. In response to the request frame, the second terminal may transmit the response frame to the first terminal, after D time elapses. In this instance, a propagation delay time between the first terminal and the second terminal may need to be considered. In other words, when the request frame is transmitted from the first terminal to the second terminal, a delay corresponding to the first propagation delay time $dT_{12}$ may occur, and accordingly the second terminal may transmit the response frame to the first terminal after the first propagation delay time $dT_{12}$ elapses from D time.

Additionally, the third terminal may transmit a response frame to the first terminal, using the information on the transmission point in time that is included in the request frame. When the request frame is transmitted from the first terminal to the third terminal, a delay corresponding to the second propagation delay time $dT_{13}$ may occur, and accordingly the third terminal may transmit the response frame to the first terminal after the second propagation delay time $dT_{13}$ elapses from D time.

The first terminal may estimate the first propagation delay time $dT_{12}$, and the second propagation delay time $dT_{13}$, using the response frames received from the second terminal and the third terminal. A time delay in transmitting of a request frame may occur when transmitting a response frame. Accordingly, the first terminal may estimate variances in time '$2*dT_{12}$' and '$2*dT_{13}$' that are generated between the first terminal and each of the second terminal and the third terminal, based on times in which response frame are received. Subsequently, the first terminal may transmit information ($dT_{12}$-$dT_{13}$) on a delay time difference associated with the second terminal and the third terminal to at least one of the second terminal and the third terminal. The second terminal and the third terminal may adjust a transmission point in time using the information on the delay time difference, and accordingly data transmitted from the second terminal and the third terminal may be synchronized and reach the first terminal.

The third terminal may transmit a response frame to the first terminal, and after a predetermined time elapses, may transmit a request frame to the second terminal. The request frame transmitted by the third terminal may include information 'S time' on a point in time when a response frame is transmitted from the second terminal. The second terminal may transmit the response frame to the third terminal, using the information on the point in time. When a request frame is transmitted from the second terminal to the third terminal, a delay corresponding to the third propagation delay time $dT_{32}$ may occur, and the third terminal may estimate the third propagation delay time $dT_{32}$, using a time in which the response frame is received.

Subsequently, after a pre-defined time 'Z time' elapses, the first terminal may transmit request frames to the second terminal and the third terminal. The first terminal may transmit the request frames at a predetermined time interval $\Delta t_h$. The request frames may include information on a transmission point in time, and information on a delay time difference, as described above. In other words, the information on the delay time difference may be included in the request frames, so that the second terminal and the third terminal may adjust a transmission point in time. Additionally, the request frames may include frequency offset adjustment information.

The second terminal and the third terminal may transmit response frames to the first terminal, in response to the request frames from the first terminal. In this instance, the second terminal and the third terminal may adjust a transmission point in time based on the information on the delay time difference, and may transmit the response frames to the first terminal. When the response frames are received from the second terminal and the third terminal to the first terminal at the same time or within a predetermined margin of error in a reception time, the first terminal may verify that synchronization for transmission and reception of data is successfully controlled.

Alternatively, the first terminal may verify a variance in time with each of the second terminal and the third terminal, using times in which the response frames are received from the second terminal and the third terminal, and may determine that synchronization for transmission and reception of data is successfully controlled. In this instance, the first terminal may insert the information on the delay time difference in only one of the request frames for the second terminal and the third terminal. For example, when the information on the delay time difference is included in the request frame for the second terminal, the second terminal may adjust a transmission point in time by '$dT_{12}-dT_{13}$,' and may transmit the response frame. The first terminal may verify a variance in time of '$2*dT_{13}+(dT_{12}-dT_{13})$,' and may determine that synchronization for transmission and reception of data is successfully controlled. An embodiment in which the information on the delay time difference is included in only one of the request frames for the second terminal and the third terminal may correspond to an embodiment described with reference to FIG. 11.

Figure 11:
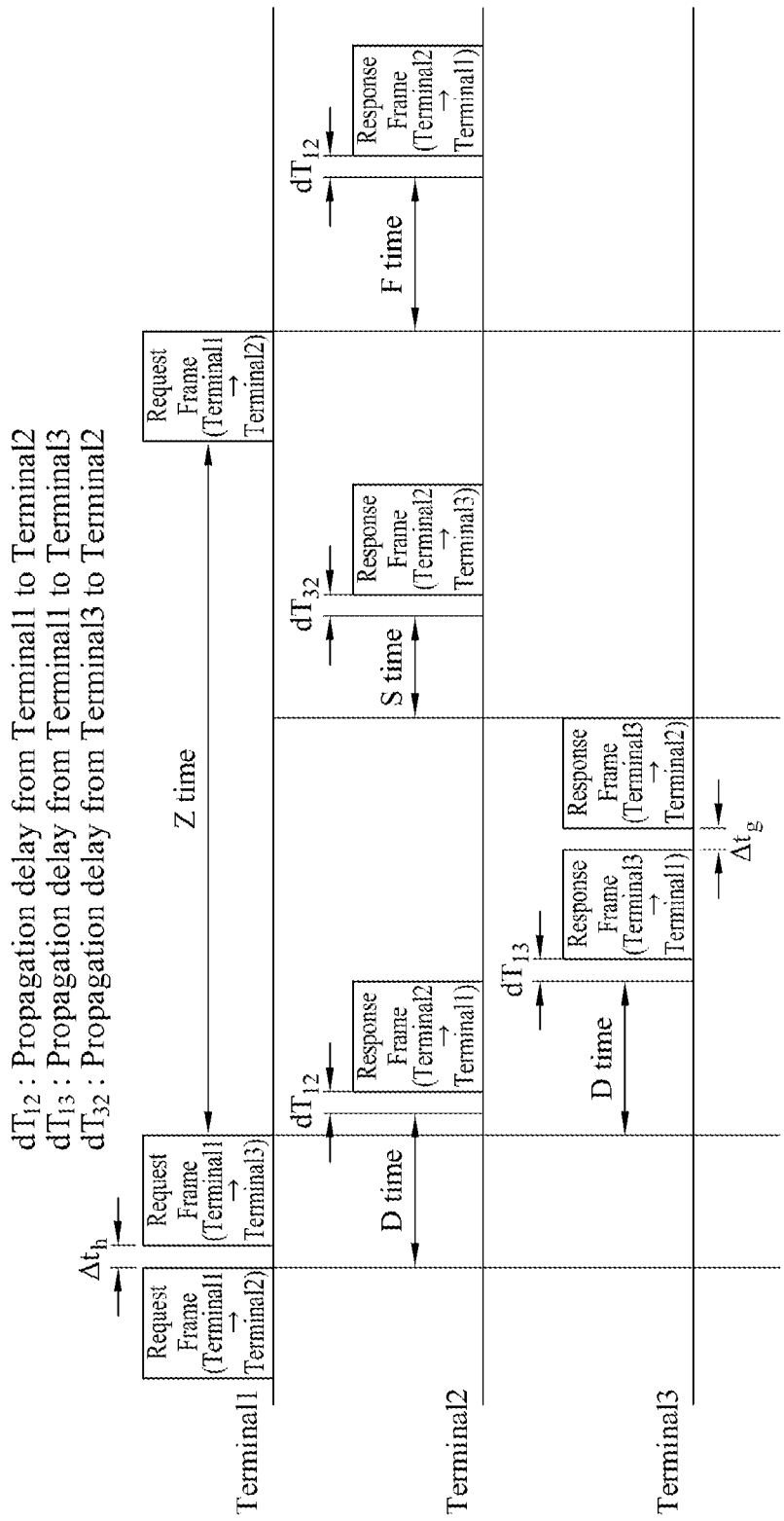
Figure 12:
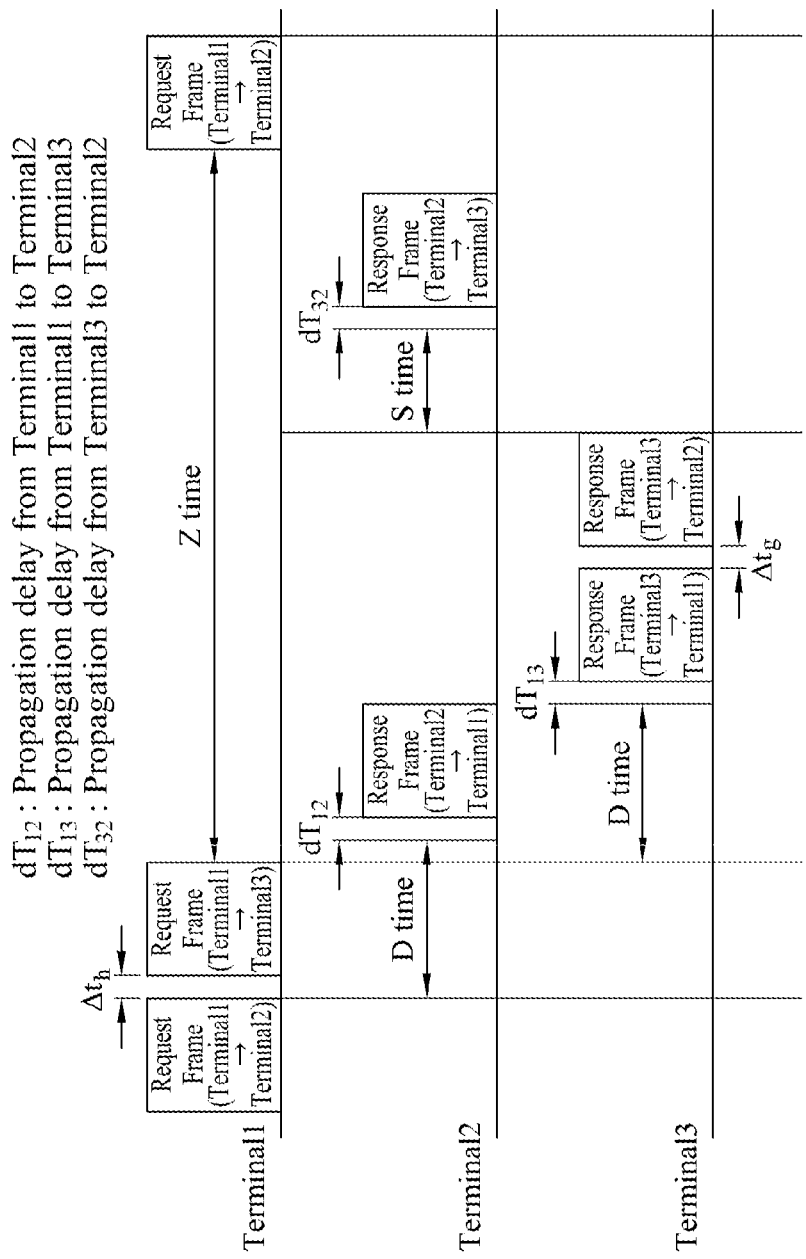
Figure 13:
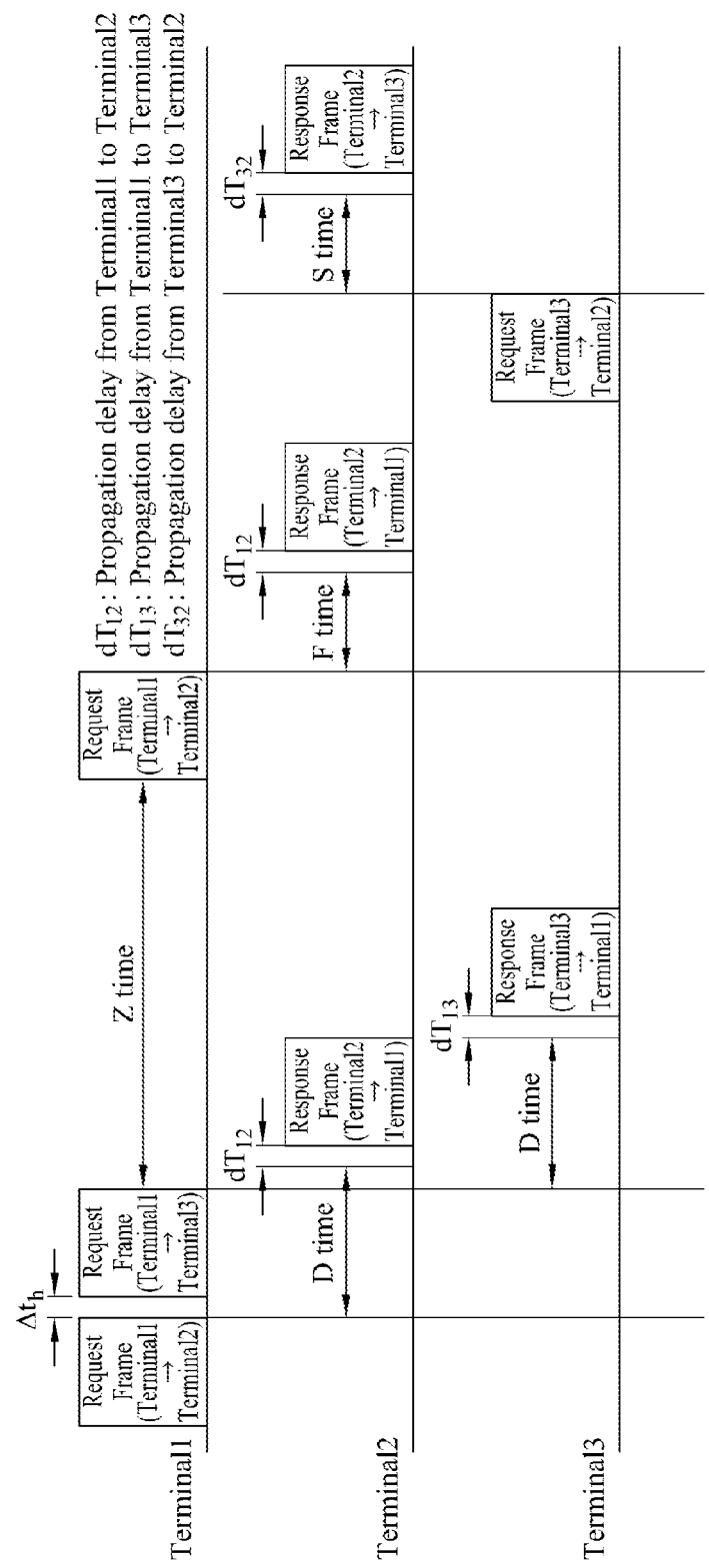

The synchronization control methods of FIGS. 11 through 13 may be similar to the synchronization control method of FIG. 10. However, in FIG. 11, a first terminal may not transmit, to a third terminal, a request frame including information on a propagation delay time difference, and the third terminal may not transmit, to the first terminal, a response frame in response to the request frame, unlike FIG. 12. Additionally, in FIG. 12, a second terminal may not transmit, to a first terminal, a response frame in response to a request frame that is received from the first terminal and that includes information on a propagation delay time difference. Furthermore, in FIG. 13, a third terminal may transmit, to a first terminal, a response frame in response to a request frame that is received from a second terminal and that includes information on a propagation delay time difference, and may then transmit a request frame to the second terminal.

When the second terminal and the third terminal transmit response frames to the first terminal in response intervals that do not overlap with each other, as shown in FIG. 3, the first terminal may easily distinguish the response frame received from the second terminal from the response frame received from the third terminal, and may easily estimate information on a frequency offset difference and a transmission point in time with respect to the second terminal and the third terminal. However, when the second terminal and the third terminal simultaneously transmit response frames to the first terminal, as shown in FIGS. 1 and 2, it may be difficult for the first terminal to distinguish the response frames received from the second terminal and the third terminal.

Accordingly, the present invention proposes a preamble structure that facilitates distinguishing frames in an environment configured as shown in FIGS. 1 and 2. In other words, a first terminal through a third terminal may transmit and receive a frame including a preamble according to the present invention, and may adjust a transmission point in time, and a frequency offset. Hereinafter, a general preamble structure, and a preamble structure according to the present invention will be sequentially described.

Figure 14:
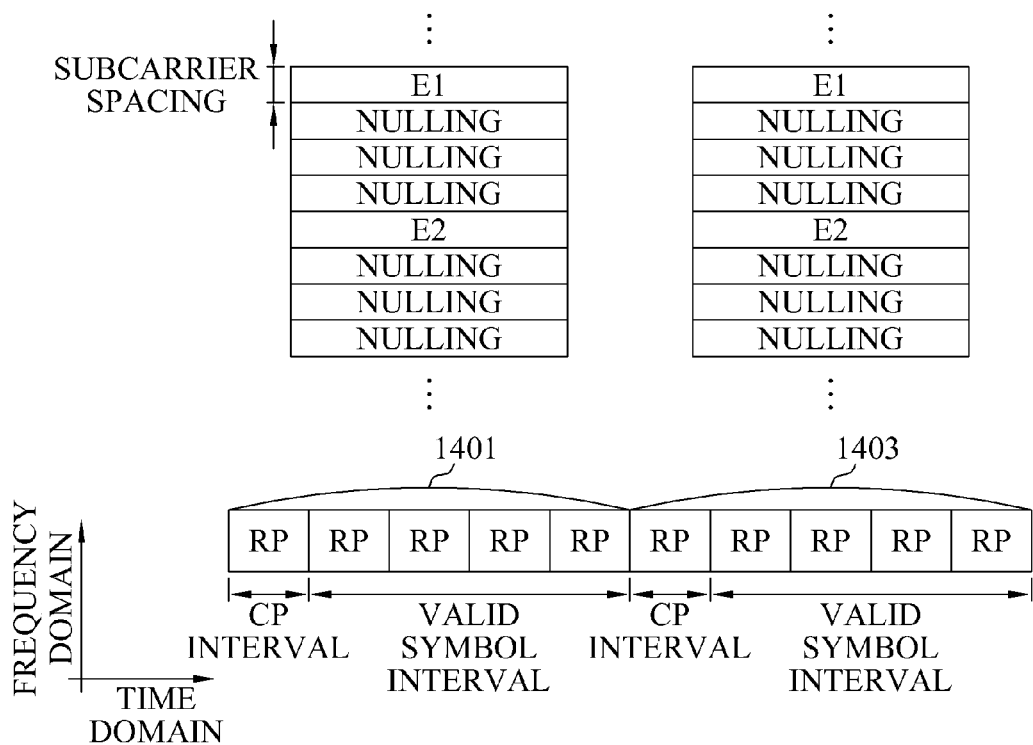
FIG. 14 illustrates a diagram to describe a preamble structure in an Institute of Electrical and Electronics Engineers (IEEE) 802.11 wireless communication system.

FIG. 14 illustrates a diagram to describe a preamble structure in an IEEE 802.11 wireless communication system.

As shown in FIG. 14, a preamble for synchronization estimation of the IEEE 802.11 may include two OFDM symbols 1401 and 1403. Each of the two OFDM symbols 1401 and 1403 may include a total of five Repetition Pattern (RP) sequences, that is, four RP sequences in a valid symbol interval and a single RP sequence in a CP interval. The four RP sequences in the valid symbol interval may include an element of a base sequence for automatic gain control, signal detection, and synchronization estimation every four subcarriers. As shown in FIG. 14, the element, for example, E1 and E2, of the base sequence may be assigned to a subcarrier based on a predetermined RP. Here, Inverse Fast Fourier Transform (IFFT) may be performed on the element of the base sequence. Additionally, the valid symbol interval and the CP interval may indicate a time interval of a time domain. The element of the base sequence may be assigned to the frequency domain with respect to the valid symbol interval and the CP interval.

The single RP sequence in the CP interval may be generated by duplicating a last RP sequence of the valid symbol interval. A reception end may perform automatic gain control, signal detection, and time and frequency synchronization using the preamble of FIG. 14.

All terminals may use a common sequence in a general WLAN environment or WPAN environment in which the preamble of FIG. 14 is used and accordingly, when a plurality of terminals simultaneously transmit preambles to a single terminal, it may be difficult for a reception terminal to distinguish the preambles for each of the terminals. In other words, it may be difficult for the first terminal in the environment as shown in FIGS. 1 and 2 to distinguish preambles of the second terminal and the third terminal, which may cause a problem that it is difficult for the first terminal to adjust a frequency offset and a transmission point in time of the second terminal and the third terminal Hereinafter, a preamble structure, and a method and apparatus for generating and transmitting a preamble to solve the aforementioned issues will be described with reference to FIGS. 15 through 20. Additionally, a method and apparatus for receiving a preamble according to the present invention will be described.

Figure 15:
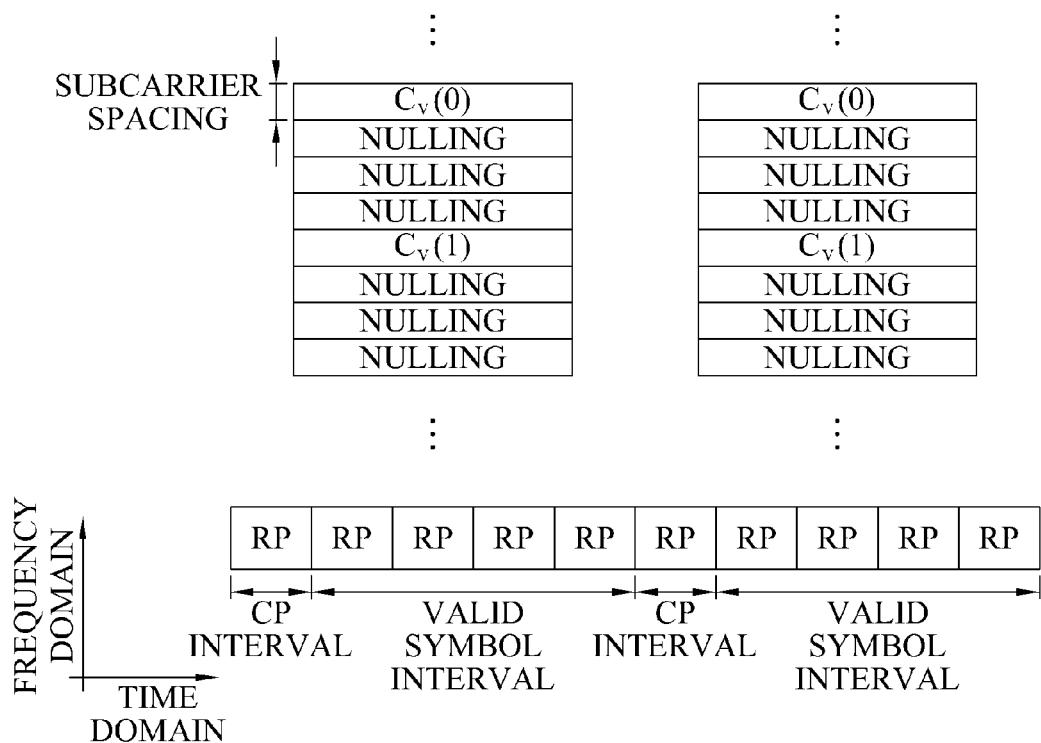
FIG. 15 illustrates a diagram to describe a preamble structure according to an embodiment of the present invention.

FIG. 15 illustrates a diagram to describe a preamble structure according to an embodiment of the present invention.

The preamble of FIG. 15 may be different from the preamble of FIG. 14 in a sequence assigned to a frequency domain. In other words, a sequence other than general sequences described in FIG. 14 may be assigned to the preamble.

In FIG. 15, $C_v$ indicates a sequence for synchronization transmission according to the present invention, and may be hereinafter referred to as a 'synchronization sequence.' An element $C_v(k)$ ($k=0, 1, 2, \ldots$) of a synchronization sequence based on a value of k may be assigned every four subcarriers. The synchronization sequence may be, for example, based on a Discrete Fourier Transform (DFT) sequence, or a Generalized Chirp Like (GCL) sequence. The synchronization sequence may be defined as shown in Equations 1 and 2.

$$C_v(k) = c(k) \cdot \exp\left\{j\frac{2\pi vk}{N_d}\right\}, v = 0, 1, 2, \cdots, N_D - 1 \quad \text{[Equation 1]}$$

$$C_v(k) = \exp\left\{-jv\pi\frac{k(k+1)}{N_P}\right\}, v = 1, 2, \cdots, N_P - 1 \quad \text{[Equation 2]}$$

In Equation 1, $N_D$ denotes a predetermined index value of 2, for example $2^n$ in which n is an integer greater than 0. Additionally, in Equations 1 and 2, v denotes an index of a sequence. For example, in FIGS. 2 and 3, 'v=2' may be applied to the second terminal, and 'v=3' may be applied to the third terminal. A sequence assigned to a terminal may be determined based on a sequence index.

Additionally, c(k) in Equation 1 may be a DFT sequence as shown in a left side of Equation 3, or a GCL sequence as shown in a right side of Equation 3.

$$c(k) = \exp\left\{\pm j\frac{2\pi k}{N_D}\right\} \text{ or}$$

$$\exp\left\{-j\rho\pi\frac{k(k+1)}{N_P}\right\} \quad \text{[Equation 3]}$$

In Equations 2 and 3, $N_P$ denotes a prime number. In Equation 3, ρ denotes an index of a GCL sequence having optimal correlation.

Figure 16:
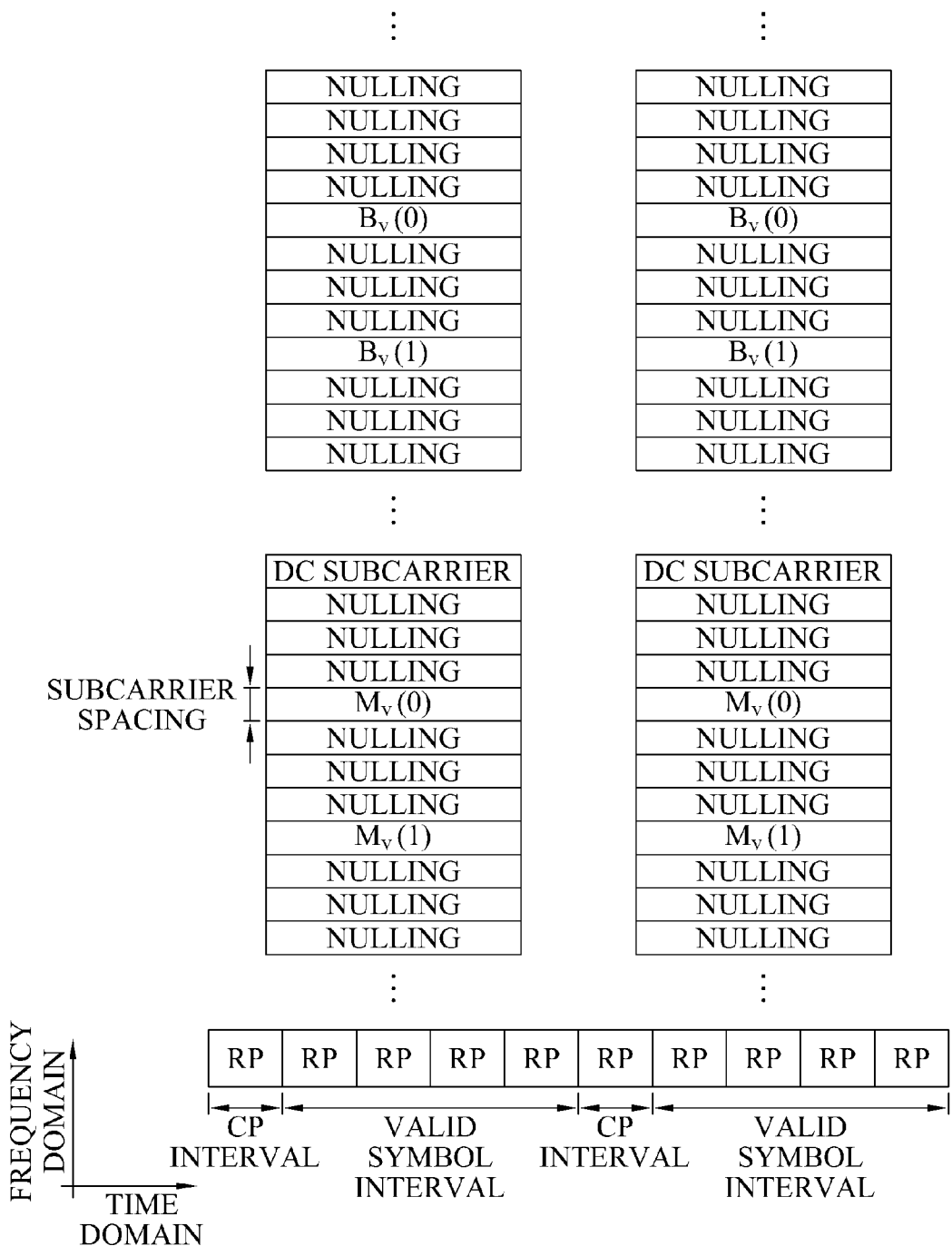
FIGS. 16 and 17 illustrate diagrams to describe a preamble structure according to another embodiment of the present invention.
Figure 17:
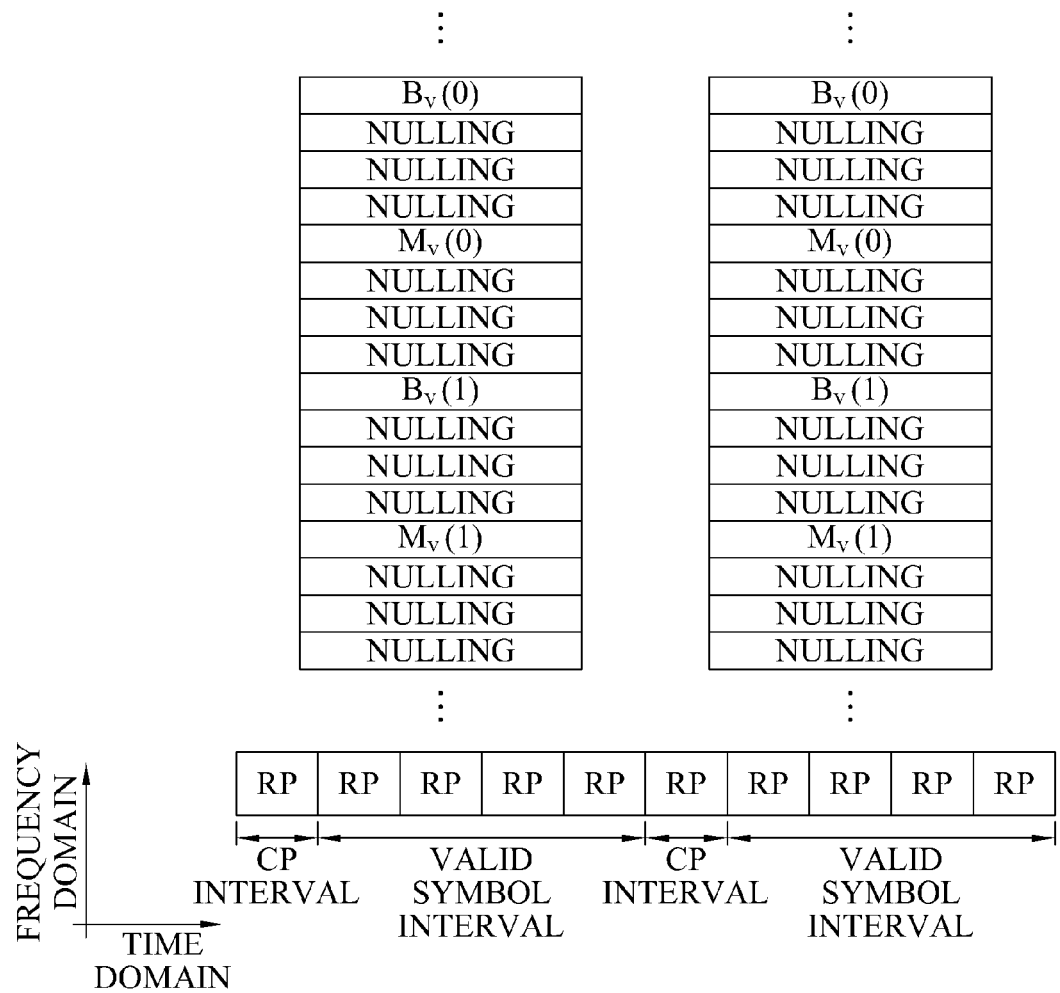

FIGS. 16 and 17 illustrate diagrams to describe a preamble structure according to another embodiment of the present invention.

As shown in FIGS. 16 and 17, both a synchronization sequence, and a modified sequence obtained by modifying the synchronization sequence may be assigned to a frequency domain. $M_v$ indicates a modified sequence, and $M_v(k)$ indicates an element of the modified sequence, for example, may be modified as shown in Equation 4 below. Additionally, a synchronization sequence $B_v$ of FIGS. 16 and 17 may be the base sequence of FIG. 14, or the synchronization sequence $C_v$ of FIG. 15. When the synchronization sequence $B_v$ of FIGS. 16 and 17 corresponds to the synchronization sequence $C_v$ of FIG. 15, the sequences may have different lengths. $B_v(k)$ indicates an element of the synchronization sequence.

$$M_v(k) = -B_v(k) \text{ or } B_v^*(k) \quad \text{[Equation 4]}$$

As shown in FIG. 16, based a DC subcarrier, a synchronization sequence may be assigned to an available subcarrier of a high-order frequency, and a modified sequence may be assigned to an available subcarrier of a low-order frequency. In other words, the synchronization sequence and the modified sequence may be sequentially assigned to subcarriers in a predetermined repetition pattern. In this instance, a subcarrier immediately above or below the DC subcarrier may be used as a reference, and the synchronization sequence and the modified sequence may be assigned to subcarriers.

Alternatively, as shown in FIG. 17, a synchronization sequence and a modified sequence may be alternately assigned to subcarriers. In other words, when four subcarriers form a single group, an element of a synchronization sequence may be assigned to an even-numbered subcarrier group, and an element of a modified sequence may be assigned to an odd-numbered subcarrier group.

When Inverse DFT (IDFT) is performed on a preamble according to the present invention, all sequence elements in a time domain may have real numbers, or half of all of the sequence elements may have zero values. Accordingly, complexity of a reception terminal may be reduced, and timing estimation performance robust in a frequency offset environment may be provided.

Figure 18:
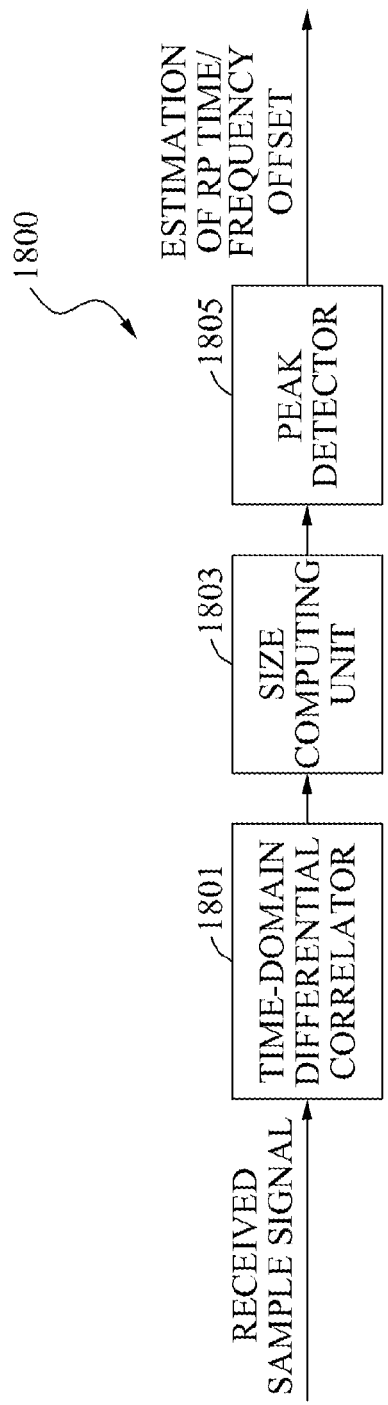
FIGS. 18 through 20 illustrate diagrams to describe a preamble receiving method according to an embodiment of the present invention.
Figure 19:
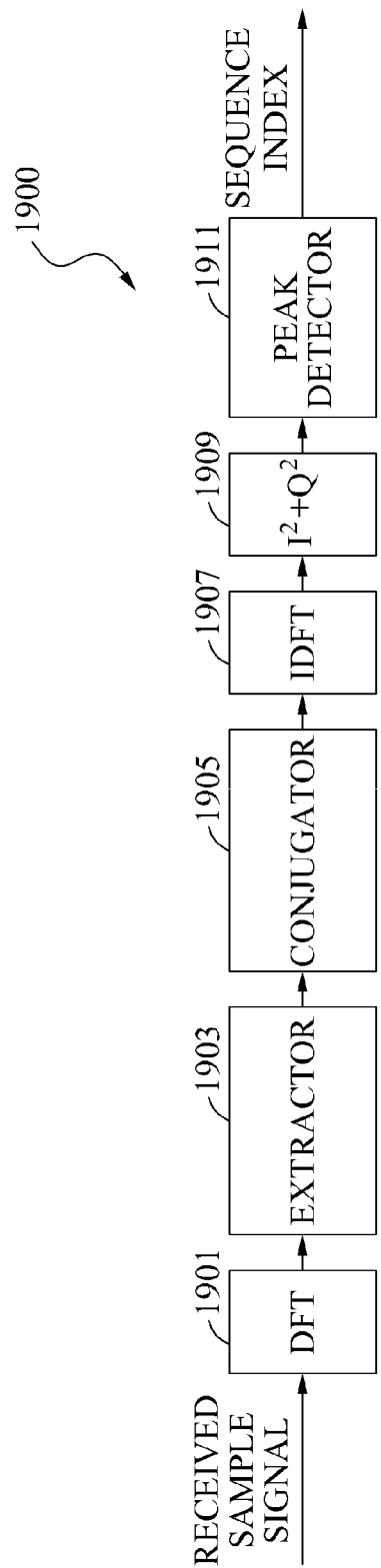
Figure 20:
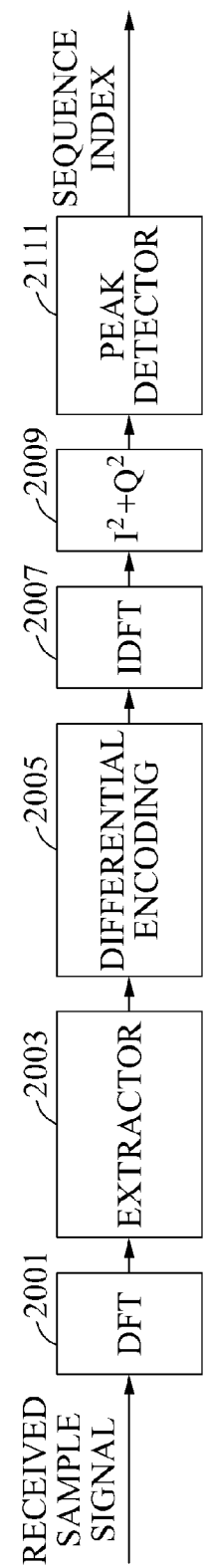

The method and apparatus for generating and transmitting a preamble according to the present invention may generate a preamble described above with reference to FIGS. 15 through 17, and may transmit the preamble to a reception terminal FIGS. 18 through 20 illustrate diagrams to describe a preamble receiving method according to an embodiment of the present invention. Additionally, a process of generating, transmitting, and receiving a preamble in a wireless communication system configured as shown in FIG. 2 will be described as an embodiment.

In response to a request frame from a first terminal, each of a second terminal and a third terminal may generate a preamble, to which a sequence corresponding to an index v assigned to each of the second terminal and the third terminal within a response frame is applied, as shown in FIG. 5, and may transmit the generated preamble to the first terminal. The first terminal may estimate a frequency offset, and arrival points in time when signals are received from the second terminal and the third terminal, through estimation of a sequence index, and correlation of a time-domain signal corresponding to the sequence for the index v mapped to each of the second terminal and the third terminal.

When a synchronization sequence defined as shown in Equation 1 or 2 is assigned to a subcarrier as shown in FIGS. 15 through 17, and when IDFT or IFFT is performed on a frequency-domain signal, an IDFT-converted sequence of c(k) that is cyclic-shifted by a sample length of 'v' mapped to the sequence index in the time domain may be repeated four times and generated. This is because a phase change in a frequency domain is represented as a cyclic shift in a time domain, and a sequence element is assigned every four subcarriers. Further description thereof will be given with reference to FIG. 18.

FIG. 18 illustrates an embodiment of a preamble receiving apparatus to acquire initial timing. A preamble receiving apparatus 1800 of FIG. 18 may receive a preamble, and may estimate a frequency offset, and a point in time when a signal is received.

A time-domain differential correlator 1801 may be used for timing estimation. Here, timing may indicate timing for a reception point in time. The time-domain differential correlator 1801 may perform differential correlation using time domain symmetry of a synchronization symbol, and may generate a complex correlation value.

More specifically, the time-domain differential correlator 1801 may buffer a sample signal corresponding to a single RP interval, and may obtain a multiplication value by multiplying a conjugated signal of an initially buffered sample signal by a sample signal next to the initially buffered sample signal. Additionally, the time-domain differential correlator 1801 may obtain a multiplication value by multiplying a next buffered sample signal by a sample signal next to the buffered sample signal. The time-domain differential correlator 1801 may repeatedly perform the above operation throughout a sample length corresponding to a single RP interval, may obtain a plurality of multiplication values, and may generate a complex correlation value either by adding the multiplication values or by obtaining an average of the multiplication values.

Additionally, the time-domain differential correlator 1801 may obtain a multiplication value by multiplying a conjugated signal with respect to a next sample signal based on the above-described process, and may add the multiplication value to the complex correlation value. In addition, an initial multiplication value may be subtracted from the complex correlation value, and a complex correlation value may be computed for each sample signal.

A size computing unit 1803 may add values obtained by squaring each of a real component and an imaginary component of each of a plurality of complex correlation values generated by the time-domain differential correlator 1801, and may compute a size of each of the complex correlation values.

The peak detector 1805 may detect a maximum complex correlation value. A sample time corresponding to the maximum complex correlation value may be estimated to be an RP interval synchronization point, and a frequency offset may be estimated using a phase of a complex correlation value in the estimated synchronization point. The RP interval synchronization point may indicate a point in time when a signal is received.

Hereinafter, a sequence index estimation method for detecting a terminal corresponding to a synchronization point and frequency offset estimated as described above will be described with reference to FIGS. 19 and 20. An example in which a synchronization sequence is defined as shown in Equation 1 will be described prior to describing an example in which a synchronization sequence is defined as shown in Equation 2. When a synchronization sequence is defined as shown in Equation 1, a preamble receiving apparatus 1900 of FIG. 19 may estimate a sequence index. When a synchronization sequence is defined as shown in Equation 2, a preamble receiving apparatus 2000 of FIG. 20 may estimate a sequence index.

The preamble receiving apparatus 1900 of FIG. 19 may perform DFT or FFT on a sample signal corresponding to at least one RP interval that is buffered (1901). When DFT is performed on at least two RP intervals, the preamble receiving apparatus 1900 may extract only an even-numbered subcarrier signal, or an odd-numbered subcarrier signal (1903).

The preamble receiving apparatus 1900 may generate $c^*(k)$ by conjugating $c(k)$ in Equation 3 (1905), and may multiply the generated $c^*(k)$ by a subcarrier signal to which $C_v(k)$ is assigned. Subsequently, the preamble receiving apparatus 1900 may perform $N_D$- or $N_P$-point IDFT or IFFT (1907), may obtain a value by squaring a signal for each converted element, and may compute a size of a converted signal (1911). In this instance, a maximum value obtained by squaring, namely an element index with respect to a maximum size, may be regarded to be a value mapped 1-to-1 to a sequence index v of Equation 1, and accordingly a size value based on the above-described process may be used to distinguish terminals. In other words, the preamble receiving apparatus 1900 may estimate a sequence index by detecting a maximum size of a signal on which IDFT is performed.

In an example of a preamble including c(k) generated by an assignment method of FIG. 16 or 17, the preamble receiving apparatus 1900 may combine received signals of two subcarrier indices that are symmetrical with respect to a high-order subcarrier index based on a DC subcarrier, as shown in Equation 5 or 6, may perform $0.5N_D$- or $0.5N_P$-point IDFT or IFFT, and may generate a size value. Here, r(k) denotes a received signal in a subcarrier k. Additionally, a subscript of r(k) denotes a corresponding sequence.

$$r_{B_v}(k) - r_{M_v}(k+N_D/2) \text{ or } r_{B_v}(k) + r^*_{M_v}(k+N_D/2) \quad \text{[Equation 5]}$$

$$r_{B_v}(2k) - r_{M_v}(2k+1) \text{ or } r_{B_v}(2k) + r^*_{M_v}(2k+1) \quad \text{[Equation 6]}$$

As shown in FIG. 17 or 18, a preamble may be generated by assigning a synchronization sequence, in order to enable a dominant peak to occur in a single element of a signal based on IDFT by enabling frequency-selective fading to flat fading. In other words, in an example of strong frequency-selective fading, a peak may not occur in a single element after IDFT, and high correlation values may be represented in several elements. Accordingly, to prevent the above phenomenon, the present invention may combine received signals using a synchronization sequence and a modified sequence, before IDFT is performed.

The preamble receiving apparatus 2000 of FIG. 20 may estimate a sequence index in a similar way to the preamble receiving apparatus 1900 of FIG. 19. However, the preamble receiving apparatus 2000 of FIG. 20 may perform differential encoding on a signal on which DFT is performed, instead of conjugating the signal.

First, a received signal of a subcarrier k corresponding to a frequency domain is assumed to be '$r_k(k)=A_k C_v(k)+w(k)$.' Here, $A_k$ denotes a value of a real number, and w(k) denotes noise applied to the subcarrier k. Here, a differentially encoded signal for $r_k(k)$ may be represented as shown in Equation 7.

$$\tilde{C}_v(k) = r_v(k-1)/r_v(k) \text{ or } r_v(k-1)r^*_v(k), (k=1,2,\ldots, \tilde{C}_v(0)=r_v(0)) \quad \text{[Equation 7]}$$

Subsequently, the preamble receiving apparatus 2000 may perform IDFT on the differentially encoded signal, may detect a size, and may estimate a sequence index.

As described above, in the present invention, a preamble may be generated as shown in FIGS. 15 through 17, and may be transmitted, and a reception point in time, a frequency offset, and a sequence index may be estimated as described above with reference to FIGS. 18 through 20. Additionally, a preamble according to the present invention may be applied to transmission of frames described with reference to FIGS. 4 through 13.

The synchronization control method for transmission and reception of data, and the method of generating, transmitting and receiving a preamble according to the present invention as described above may be recorded as a computer program. A code and a code segment constituting the program may be readily inferred by a computer programmer in the field. Also, the program may be stored in computer-readable recording media (information storage media) and may be read and executed by a computer, thereby implementing the method of the present invention. The recording media may include all types of computer-readable recording media, for example, tangible media such as CD and DVD and intangible media such as subcarriers.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A source station for synchronization of transmission and reception of data in a cooperative communication system, the source station comprising:
 a first receiver to receive, from a destination station, a first request frame including information regarding a first point in time when a first response frame is to be transmitted;

a first transmitter to transmit the first response frame to the destination station, at the first point in time;

a second transmitter to transmit, to a relay station, a second request frame including information regarding a second point in time when a second response frame is to be transmitted;

a second receiver to receive the second response frame transmitted by the relay station at the second point in time; and a time estimator to estimate a first propagation delay time between the source station and the relay station, based on a time in which the second response frame is received, wherein the destination station estimates a second propagation delay time between the source station and the destination station, using a time in which the first response frame is received, and estimates a third propagation delay time between the relay station and the destination station, using a third response frame received from the relay station.

2. The source station of claim 1, further comprises:
a third transmitter to transmit, to the relay station, a third request frame including information regarding a third point in time when a third response frame is to be transmitted; and
a third receiver to receive the third response frame from the relay station, in response to the third request frame.

3. The source station of claim 1, wherein each of the first request frame and the second request frame comprises a first preamble and a second preamble,
wherein each the first preamble and the second preamble comprises a synchronization sequence and a modified sequence obtained by conjugating the synchronization sequence.

4. The source station of claim 3, further comprises a modifier to obtain the modified sequence based on the synchronization sequence.

5. The source station of claim 3, wherein a rate between the modified sequence and the synchronization sequence is 1:1.

6. The source station of claim 3,
wherein the first preamble and the second preamble are non-overlapped with each other.

\* \* \* \* \*